May 13, 1952 J. D. REARDON ET AL 2,596,917
PROJECTION APPARATUS
Filed Aug. 28, 1948 2 SHEETS—SHEET 1

Fig. 1

INVENTORS
JOSEPH D. REARDON, &
LESLIE J. PETERS
BY
ATTORNEYS

May 13, 1952  J. D. REARDON ET AL  2,596,917
PROJECTION APPARATUS
Filed Aug. 28, 1948  2 SHEETS—SHEET 2

INVENTORS
JOSEPH D. REARDON, &
LESLIE J. PETERS
BY
ATTORNEYS

Patented May 13, 1952

2,596,917

UNITED STATES PATENT OFFICE 2,596,917

PROJECTION APPARATUS

Joseph D. Reardon, Snyder, and Leslie J. Peters, Buffalo, N. Y., assignors to American Optical Company, Southbridge, Mass., a voluntary association of Massachusetts Application August 28, 1948, Serial No. 46,652

19 Claims. (Cl. 240—41)

This invention relates to an optical projector and more particularly to an improved assembly for accurately mounting an incandescent lamp, a reflector and a condenser lens system in predetermined optical alignment therein.

It is an object of the present invention to provide means for accurately positioning and aligning a condenser lens system, a small filament light source and a reflector relative to a predetermined optical axis for projection purposes.

Another object of the invention is to provide improved, adjustable mounting means for a prefocused incandescent lamp having a very small filament for producing a high intensity light.

Another object of the invention is to provide mounting means of the aforesaid type wherein ease of installation and removal of the prefocused lamp are rendered possible.

A further object of the invention is to provide a lamp mounting wherein means for focusing and securely retaining the prefocused lamp are incorporated, in part, in a readily removable inner housing or shield member.

Still another object of the invention is to provide a lamp mounting wherein no forcible handling of the lamp is required for properly seating said lamp in its properly focused position.

A still further object of the invention is to provide a lamp mounting incorporating novel means for positioning and securely supporting the lamp with its filament in a predetermined operative position.

Another object of the invention is to provide means including a lamp mounting which incorporates efficient ventilation means and simple and sturdy constructional features.

A further object of the invention is to provide sturdy complementary engaging members for locking the prefocused lamp in position which are incorporated in permanent parts of the assembly rather than in the lamp base, thereby insuring more positive seating of the lamp at a predetermined operative position than is usually possible.

These and other objects of the invention will be apparent from the following description taken in connection with the accompanying drawings wherein like reference characters refer to like parts throughout the several views.

Figure 1:
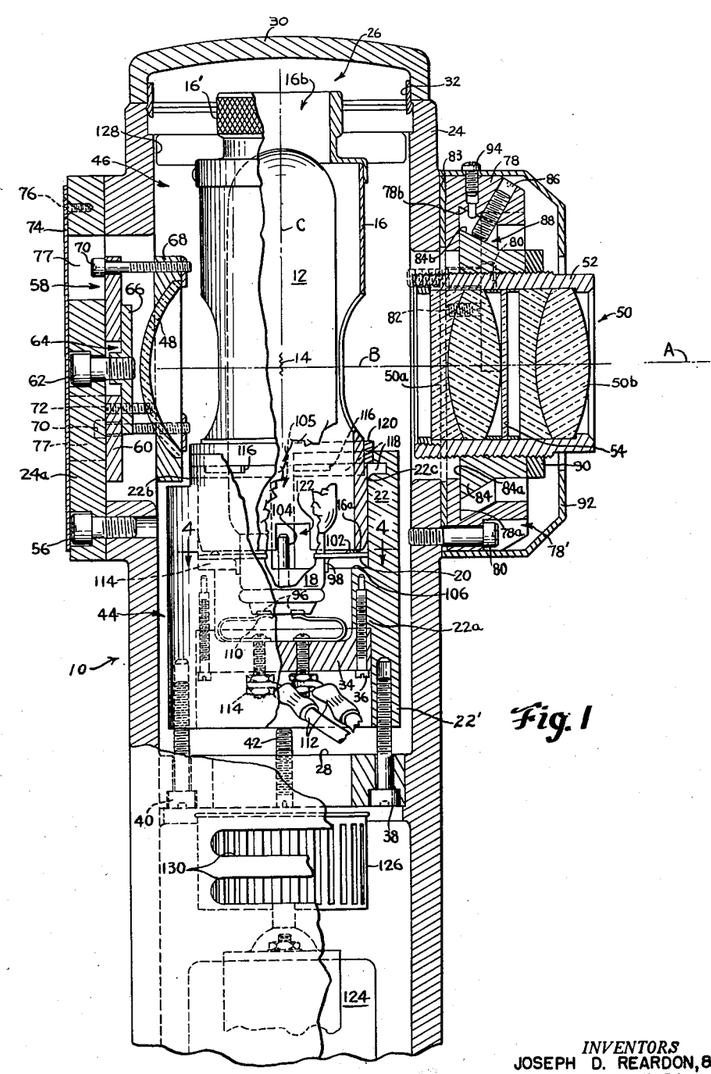
Fig. 1 is a side view of the lamp housing assembly, partly in section and partly with elements broken away.

Referring to Fig. 1, an assembly 10 comprising a light source 12 having a filament 14 and associated elements for providing an illuminating beam in operative relation to a predetermined optical axis A is shown. The assembly 10 is suitable for use in association with an objective lens system or other components of an optical projector (not shown) as, for example, with a contour projector wherein it may be assumed that the optical axis B of the assembly has been adjusted and collimated with respect to the optical axis A of an image-forming system of the instrument.

Apparatus of the invention comprises means for certainly and conveniently mounting the lamp 12 of the projector optical system at prefocused position relative to a reflector and a lens system, such an association of elements being shown in Fig. 1. Said apparatus is of particular advantage where the filament 14 is of a concentrated type, as, for example, in the form of a single coil as shown, although not limited to a single coil, it being evident that where the filament is very small, a slight displacement thereof relative to the associated optical axis may greatly impair the illuminating beam. When the lamp 12 is removed and replaced by another, exact repositioning of the filament relative to the optical axis and focal plane of the condenser lens is automatically obtained without readjustment, it being understood that the filament of the lamp is very exactly positioned relative to the mounting means associated with the lamp base during manufacture of the lamp. For the purpose of obtaining said precise repositioning, a plurality of associated elements embodying novel constructions are provided as a part of the assembly 10 for insuring correct vertical, lateral, longitudinal and rotational positioning of filament 14.

These elements, comprising a removable lamp shield or chimney 16 and associated positioning means therefor, a lamp base 18 having a flange member 20 associated therewith and a multiple purpose socket member 22, are all of special construction and are adapted to cooperate with one another to effect the aforesaid mounting or positioning of the lamp relative to the optical axis B. Said construction enables easy and rapid manual insertion of the lamp to a preliminary mounting position without the necessity of applying pressure thereto, final correct positioning of the lamp being achieved easily and rapidly thereafter merely by inserting and, in the example shown, by slightly turning the lamp shield 16 in the socket member 22. A knurled upper end portion 16' of shield 16 is provided for manually inserting and removing the latter. An outer main housing 24, preferably cylindrical in shape and having an aperture 26 formed in the upper extremity thereof for insertion or removal of the shield 16 and lamp 12, serves to enclose and support elements of the apparatus and comprises an inwardly extending integral or rigidly attached annular supporting member or flange 28 for mounting the lamp socket and associated elements. A cover member 30, releasably mounted upon housing 24, as by clip members 32, provides a closure for aperture 26.

In the preferred embodiment, shown in Fig. 1, socket member 22 is adapted to be adjustably mounted transversely centrally of housing 24 upon an annular support 28 fixedly positioned within said housing 24. A bar member 34, formed of a suitable insulating material such as hard rubber, Bakelite or the like, is rigidly mounted upon an inner portion 22a of the socket member 22 by a plurality of retaining screws 36. As shown, socket portion 22' is adjustably connected with annular socket support 28 by a pair of tensioning- or pull-screws 38 and 40 which are slidably and somewhat loosely mounted in a pair of perforations formed in member 28, preferably in a vertical plane which substantially longitudinally bisects socket 22 and includes optical axis B. Screws 38 and 40 are threaded in socket portions 22', said screws cooperating with a pair of thrust- or push-screws 42 (one only of said screws 42 being shown) threaded in supporting member 28, screws 42 also lying in a vertical plane which substantially bisects socket 22 but which is substantially normal to said first-named plane. Screws 42 are adapted to bear against the bottom of socket portion 22'. Inasmuch as adjusting screws 38 and 40 are employed in a retaining or pulling capacity relative to socket portion 22', they are being referred to herein as "pull-screws" for convenience of terminology. Screws 42, on the other hand, having a bearing or pushing function are being termed "push-screws."

Assuming the assembly to be positioned vertically, as illustrated in Fig. 1, it will be understood that by loosening pull-screws 38 and 40 equally and by tightening push-screws 42 equally, or vice versa, the assembly comprising socket member 22, bar 34, lamp 12 and lamp shield 16 may be adjusted vertically to provide vertical adjustment of filament 14 with respect to optical axis B. It follows that by loosening pull-screw 38 and tightening pull-screw 40, or vice versa, tilting of the aforesaid assembly about the upper ends of the push-screws 42 as a center is achieved and, accordingly, angular movement of filament 14 in a direction longitudinally of the optical axis B is obtained. Differential adjustment of each of the push-screws 42 is permitted to a small but sufficient degree to allow some transverse tilting of the lamp through the aforesaid loose fit of pull-screws 38 and 40 in supporting member 28, said last-named adjustment enabling movement of lamp filament 14 transversely with respect to optical axis B. It will be observed that a space 44 is provided between socket member 22 and outer housing 24 and that a space 46 is provided between lamp shield 16 and said housing 24, whereby interference with aforesaid adjustments through contact of movable and fixed parts of the assembly is avoided.

A suitable optical system for incorporation in housing 24 and for association with lamp 12 comprises a concave reflector 48 and a high-speed condensing lens assembly 50 represented by doublets 50a and 50b mounted in lens tube 52, said lens assembly preferably being of a type highly corrected both for chromatic and for spherical aberration. A color filter element 54 may suitably be positioned between doublets 50a and 50b. Or at times a heat screen lens might be used with or in place of this filter. Relative preadjustments of the condenser lens, reflector and lamp mounting means will presently be described.

Means for mounting and adjusting reflector 48 comprise a supporting plate-like housing portion 24a, releasably attached to main housing 24 by a plurality of screws 56, and a carrying means 58 for the reflector. The carrying means 58 comprises a plate 60 releasably clamped upon the inner surface of housing portion 24a by a tensioning screw 62 extending loosely through a central opening in 24a and freely through an enlarged aperture 64 in plate 60. Screw 62 is threaded in a clamping plate 66, the latter being caused to bear against plate 60 when screw 62 is tightened and to frictionally hold said plate 60 in any adjusted position. Upon loosening screw 62, plate 60 may be adjusted in any direction perpendicular to the optical axis B for alignment purposes, considerable movement thereof being permitted by the ample dimensions of aperture 64. The reflector carrying means 58 also includes a reflector mount or frame 68 which, in addition to the perpendicular movement just mentioned, is rendered both longitudinally and angularly adjustable in any direction relative to the optical axis B by means of a plurality of adjustable tensioning- or pull-screws 70, passing freely through suitable perforations formed in plate 60 and threaded in mount 68, and a plurality of adjustable thrust- or push-screws 72, threaded in plate 60 and bearing against the back of mount 68.

Figure 2:
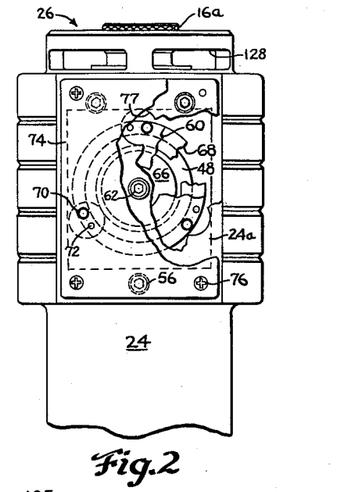
Fig. 2 is a rear elevation view of the assembly with elements partly broken away.

Preferably three equally spaced push-screws and three companion pull-screws are employed. The relative position and function of the reflector mounting elements are shown in further detail in Fig. 2 which is a rear elevational view of housing 24 with parts of removable housing portion 24a and the elements mounted therein broken way. Operation of the pull-screws and push-screws to achieve angular and longitudinal adjustments of the reflector will be apparent from the drawings. For example, an equal loosening of the pull-screws and an equal tightening of the push-screws provides a forward movement of the reflector while an unequal adjustment of said screws produces any small amounts of angular adjustment of the mirror desired. A cover plate 74 may appropriately be mounted on the outer surface of housing portion 24a, as by a plurality of retaining screws 76, whereby the adjusting screws 62, 70, and 72, which are accessible through openings 77 in portion 24a, are concealed. Cover plate 74 thus prevents tampering with the adjustment screws after preadjustment of the reflector. It will be observed that portions 22b of socket member 22 have been cut away to permit close positioning of the lamp and reflector to one another.

Figure 3:
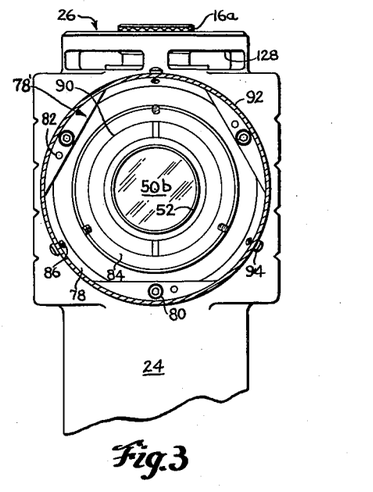
Fig. 3 is a front elevation view partly in section, showing means for mounting the condenser lenses of the assembly.

A mounting assembly for condenser lens system 50 is shown in section from the side in Fig. 1 and in front elevation in Fig. 3. Said assembly incorporates features of adjustability generally similar to those described above relative to the reflector assembly. A primary supporting member 78 is mounted upon housing 24 by a plurality of tensioning- or pull-screws 80 adapted to turn freely in a plurality of perforations formed in said member 78 and threadedly engaging housing 24, and a plurality of thrust- or push-screws 82 threadedly engaged through said member 78 and bearing against an annular hardened metallic ring 83 interposed between member 78 and housing 24 and held in place by the pull-screws 80. Pull-screws 80 and push-screws 82, which are mounted in recessed portions 78' of member 78, enable angular movement of said member 78 in any direction desired for repositioning the axis of the condenser lenses parallel to axis A. Lens tube 52 is threadedly engaged for longitudinal adjustment along optical axis B in a movable mounting or carrier member 84. Carrier 84 is adjustably mounted for movement normal to axis A and for retention at a position which places the axis of the condenser lenses at coincidence relative to said axis A. Means for obtaining said movement and for establishing coincidence of said axes comprise an accurately machined surface 84a of said carrier 84 adapted to be slidably engaged by a similarly machined surface 78a of primary supporting member 78 and a plurality of predeterminedly circumferentially spaced and adjustable centering and retaining screws 86, as shown in Fig. 3. Screws 86 are threaded in member 78 and bear upon angled surface areas 84b of member 84 in a direction preferably perpendicular thereto. It will be apparent that by loosening one or more of centering screws 86 and tightening others of said screws, carrier 84 may be moved in any direction transversely of axis A for alignment therewith and then may be held rigidly at the position thus obtained and simultaneously biasing carrier 84 toward primary supporting surface 78a. Supporting member 78 comprises angled surface areas 78b for providing a space 88 between supporting member 78 and carrier member 84 which enables said transverse movement of the latter. A locking ring 90 is threadedly engaged with lens tube 52 for holding the lens tube fixed against rotation with respect to said carrier member 84 after lens tube 52 has been rotated to the proper longitudinal adjustment. A cover plate 92 slides over and is releasably retained upon supporting member 78 and slightly spaced from tube 52 by suitable means such as a plurality of retaining screws 94.

Relative preadjustment of the optical system comprising the condenser lens assembly, reflector assembly, and lamp mounting assembly may be accomplished as follows. The optical axis B of the condenser lens is placed in parallel relation to the predetermined optical axis A of an image forming system by adjusting pull-screws 80 and push-screws 82 in the manner above described. Optical axis B of the condenser lens is then placed at coincidence with said optical axis A by adjusting centering screws 86. The above adjustments are accomplished by any known or conventional method. With lamp 12 approximately centrally located in the assembly, locking ring 90 may be loosened and lens tube 52 rotated to establish the focal plane of the condenser lens system substantially at a point on axis B which is intersected by filament 14. The lamp socket assembly may then be moved as hereinabove described through adjustment of pull-screws 38 and 40 and push-screws 42 to position filament 14 correctly relative to optical axis B and exactly within the focal plane of the condenser lens system 50. Reflector 48 may finally be positioned through adjustment of retaining screw 62, pull-screws 70 and push-screws 72 to bring the reflected image of filament 14 to a proper position so that the reflected image of the coil of the filament will be focused beside the actual coil of the filament in the aforesaid focal plane of the condenser lens, to thus obtain maximum illumination.

Figure 4:
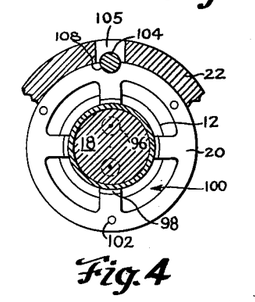
Fig. 4 is a fragmentary view of lamp mounting elements taken along section line 4—4 of Fig. 1 and looking in the direction of the arrows.
Figure 5:
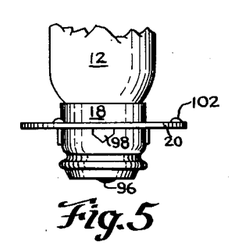
Fig. 5 is a side view of the lamp base and mounting flange therefor.
Figure 6:
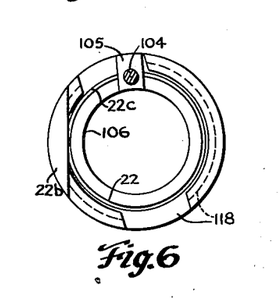
Fig. 6 is a plan view of socket means for mounting the lamp and lamp shield.
Figure 7:
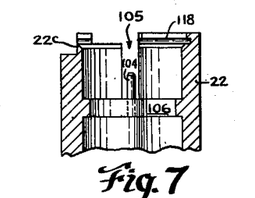
Fig. 7 is a fragmentary sectional view of the socket.
Figure 8:
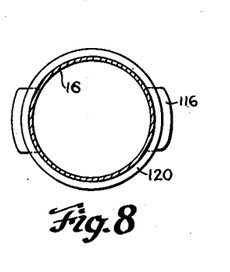
Fig. 8 is a plan view of the lamp shield partly in section.
Figure 9:
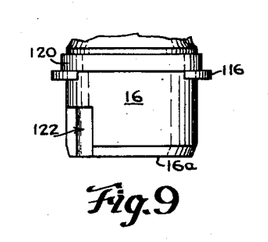
Fig. 9 is a fragmentary side view of lower portions of the lamp shield.

Means for mounting lamp 12 in socket 22 to enable consistently correct repositioning of filament 14 with respect to the preestablished optical axis B and coincident focal planes of the condenser and reflector whenever a lamp is reinserted or replaced in the assembly 10 will now be described. Fig. 4, taken along section line 4—4 of Fig. 1, shows the lamp base and associated elements in further detail. Lamp base 18 is preferably formed concentric with a vertical center line C (Fig. 1) extending through base 18 and filament 14. Said lamp base is of conventional construction and comprises appropriate electrical contact means such as a pair of electrical contacts 96 positioned upon the bottom thereof. Flange member 20 which is preferably concentric with base 18 and, accordingly, concentric with filament 14, is rigidly mounted upon said base by a plurality of supporting brackets 98. Flange member 20 preferably extends laterally in a plane perpendicular to the center line C of the lamp. Center line C is established coincident with a vertical center line of the assembly through aforesaid relative preadjustments of the condenser lens system, reflector and socket.

Flange 20 is provided with a plurality of perforations 100 formed therein for ventilation purposes, the periphery of said flange being formed, at least in a substantial part, to conform closely to the inner surface contour of socket member 22. Thus flange 20 may be slidably engaged by said socket member while being moved vertically and it will be firmly held against lateral displacement thereby. Spacer means comprising a plurality of protruding studs or bosses 102 are rigidly attached to, or formed integral with the upper surface of flange member 20, said studs or bosses 102 being preferably three in number and having accurately formed bearing surface areas facing upwardly toward the lamp filament, said stud or boss surface areas, for example, lying in a plane which is preferably perpendicular to said center line C. The function of said studs or bosses will be presently described.

Means are provided for fixing lamp 12 against rotation around the longitudinal axis thereof defined by center line C when the lamp is mounted in the assembly. Said means comprises complementary male and female elements incorporated with flange member 20 and socket member 22 and, as shown in Fig. 4, comprises a pin 104, rigidly mounted upon a shoulder 106 formed within socket member 22 and a notch 108 formed in the periphery of flange member 20, said pin 104 extending longitudinally of and partially protruding within the inner surface of said socket member for engagement with said notch. A slot 105 is formed in the wall of socket member 22 for facilitating mounting of said pin 104 on shoulder 106. The position of filament 14 established by the engagement between the pin and notch is one which faces the filament correctly relative to the optical axis B for projection purposes.

Means for biasing the lamp upwardly toward aperture 26 of the housing are incorporated in suitable spring means such as a pair of springs 110 or other suitable resilient biasing means. Said springs may conveniently be mounted upon bar member 34 and are adapted to bear against the underlying surface of base 18 as, for example, against contacts 96 when pin 104 is engaged in notch 108. In the embodiment shown, spring member 110 are also utilized to provide electrical connections for the lamp as indicated by lead wires 112 and binding posts 114. As shown, springs 110 are preferably set in an elongated recess in bar 34 which bears against their edges and prevents rotation thereof. Shoulder 106 also serves to limit the depth to which the lamp may be inserted while manually inserting the same, said shoulder providing a limit stop for engaging flange member 20 of the lamp base and thereby preventing undue flexing of springs 110.

When lamp 12 is first placed in the assembly and the flange 20 inserted in socket 22, prior to the introduction of lamp shield 16, the lamp base will be supported by springs 110 and flange 20 will be caused to assume a position somewhat higher in the socket than that shown in Fig. 1. At such time, the space between the upper surface of shoulder 106 and the under surface of flange 20 will be somewhat greater than the space 114 indicated in Fig. 1 of the drawing. Cooperating fastening or holding means for finally and automatically bringing lamp filament 14 to a correct operative position relative to the optical axis B are incorporated in portions of the lamp shield 16, the socket member 22, the springs 110, and the flange member 20. In the present embodiment, said fastening or holding means preferably comprise a pair of male bayonet portions 116 fixedly mounted on the outer surface of lamp shield 16 and these portions 116 are adapted to be inserted into bayonet slots 118 formed in socket member 22, the upper bearing surfaces of bayonet portions 116 and the bearing surfaces of slots 118 adjacent thereto being accurately machined for providing contact areas in a predetermined plane or planes which are at a fixed spacing with respect to the optical axis B, as shown in Fig. 1 of the drawings. A collar member 120, integral with or rigidly attached to lamp shield 16 contributes to firm seating of lamp shield 16 in socket member 22.

As shown, the lower extremities of lamp shield 16 terminate in a substantially open end formed by a generally circular rim area 16a which permits the shield to be slipped endwise over the lamp. Said area 16a comprises an accurately machined surface portion which, when the shield is being inserted in the socket, is brought into contact with studs or bosses 102 of the flange 20. Said rim area 16a is exactly spaced from said upper surfaces of bayonet portions 116. When the shield 16 is forcefully pressed downwardly against the flexing action of the springs 110 and rotated a few degrees the bayonet parts 116 will be positioned within bayonet slots 118. When the manual pressure is released the upper bearing surfaces of bayonet members 116 will be brought in contact with the adjacent bearing surfaces of bayonet slot 118 and said bayonet parts will hold flange 20 in a predetermined position under the bias applied to the lamp base by springs 96. It will be apparent that this predetermined position of flange 20 is that which places the lamp filament 14 correctly with respect to optical axis B, it being understood that the lamp is of the prefocused filament type.

An excised area 122 of lamp shield 16 is provided and permits the lamp shield to be inserted fully in socket member 22 without interference from pin 104. Said excised area 122 is of predetermined width however and, in conjunction with pin 104, constitutes means enabling lamp shield 16 to be inserted in socket 22 at a given position only, pin 104 providing a limit stop for contacting an edge of the lamp shield forming said excised area 122 when the lamp shield bayonet members 116 are turned to locking position within bayonet slots 118. Cooperation of pin 104 and excised area 122 of the lamp shield thus insures that the same areas of surface 16a of lamp shield 16 are always brought into contact with studs or bosses 102. Tapered edge 22c of the socket member permits lamp flange 20 and lamp shield 16 to be more easily inserted in said socket member.

A suitable cooling system of a "down-draft" type associated with the above-described assembly comprises a motor-driven fan, shown schematically in Fig. 1, comprising motor 124 and centrifugal fan 126 and a plurality of predeterminedly positioned louvers formed in housing 24. The motor may appropriately be mounted upon portions of housing 24 or it may be attached to a separate base member (not shown) upon which housing 24 is also mounted. Louvers 128 may be provided in the upper portion of housing 24 for permitting cooling air to be drawn into the housing and a plurality of louvers 130 formed in housing 24 adjacent fan 126 may be provided for permitting heated air to be expelled from the assembly. A pair of said last-named louvers are shown, another pair (not shown) preferably being positioned on the opposite side of housing 24.

A portion of the air entering upper louvers 128 is drawn downwardly by the fan exteriorly of lamp shield 16 through the space provided between shield 16 and housing 24 and between socket assembly 20 and said housing. Another portion of the air entering the upper louvers is caused to flow inwardly and downwardly through aperture 16b in knurled portion 16' of the lamp shield, said air passing downwardly between the lamp and lamp shield, through perforations 100 formed in flange member 20 and by the opposite sides of bar 34. It will thus be observed that passages or chamber means for circulation of air are provided both within and exteriorly of lamp shield 16. Accordingly, knurled portion 16' is always maintained relatively cool. Thus means are provided for inserting the lamp 12 through an extremity of housing 24, making it possible to mount fan 126 directly beneath the lamp assembly in proximity to heat emitting portions thereof, this arrangement enabling a sturdy and compact assembly.

Various possible modifications of the apparatus will be apparent within the scope of the invention. The assembly obviously could be positioned in a manner other than that shown and described. For example, it could be attached to an overlying supporting member and suspended therefrom so as to extend vertically downward. Lamp mounting means of the invention could appropriately be employed in other optical projectors or the like wherein prefocusing of the lamp filament is of importance. Adjustable mounting means of the type shown herein for a lens system, a reflector and a lamp socket are also adapted to be used in other projectors wherein adjustability of said elements is of advantage. Since certain changes in the constructions set forth could be made without departing from the spirit of the invention, it is intended that all matter contained in the above description or shown in the accompanying drawings shall be interpreted as illustrative and not in a limiting sense.

What is claimed is:

1. A device for use with a lamp having a base and a filament exactly positioned relative to said base for predeterminedly positioning said filament relative to an optical axis comprising a lamp positioning means predeterminedly attached to said lamp base and extending laterally therefrom, a lamp shield for substantially surrounding said lamp having a leading portion for bearing against said lamp positioning means in a given direction, socket means for slidably receiving said lamp positioning means and said leading portion of the lamp shield and for determining the lateral position thereof, resilient means fixedly mounted relative to said socket for bearing against one of said lamp base and lamp positioning means and applying a bias thereto in a direction opposite to said bearing direction of the leading portion of the lamp shield, and mutually engaging and coacting connection means carried by said lamp shield and said socket means and spaced from said lamp positioning means for releasably locking said lamp shield at a predetermined depth in said socket means under bias conveyed thereto from said resilient means whereby the position of said leading portion of the lamp shield is predeterminedly established in said socket means and said portion and said lamp positioning means are held in contact at a predetermined position relative to said optical axis.

2. A device for use with a filament lamp having a base and positioning means incorporated therewith, the latter being positioned on said base at a given location relative to the filament thereof, said device comprising a socket for receiving said lamp positioning means when inserted therein in a given direction and for holding said means fixed against rotational and lateral movement relative to said socket, resilient means mounted adjacent said socket for contacting a part fixed relative to said lamp base for applying a bias to said lamp in a direction opposite to said direction of insertion of said lamp, lamp shield means for substantially surrounding said lamp having portions slidable into said socket in a similar direction to said lamp positioning means, said lamp shield means having other portions providing, when the lamp shield is thus inserted, a bearing surface against which said lamp positioning means is held in a predetermined relative position under bias of said resilient means, thereby providing a predetermined relative directional position of the lamp filament, and complementary fastener means carried by said socket and said lamp shield in spaced relation both to portions of the socket occupied by said lamp positioning means and to said bearing surface portions of the lamp shield, said fastener means being for engaging one another at a predetermined stage of insertion of the lamp shield in the socket and for releasably holding said lamp shield mounted at a predetermined depth therein, thereby defining the portions of said socket at which said bearing surface and lamp positioning means are held in contact with one another under bias of said resilient means, the spatial position of said lamp filament relative to said socket portions thus being automatically established.

3. A device for use with a filament lamp having a base and positioning means incorporated therewith, the latter having functional parts positioned on said base at a given location relative to the filament thereof, said device comprising a socket for receiving said lamp positioning means when inserted therein in a given direction and for holding said means fixed against lateral movement relative thereto, means incorporated with said socket for holding the lamp fixed against rotation therein, resilient means mounted adjacent said socket for contacting a part fixed relative to said lamp base for applying a bias to said lamp in a direction opposite to said direction of insertion of said lamp, lamp shield means for substantially surrounding said lamp having portions slidable into said socket in a similar direction to said lamp positioning means, said lamp shield means having other portions providing, when the lamp shield is thus inserted, a bearing surface against which said lamp positioning means is held in a predetermined relative position under bias of said resilient means, thereby providing a predetermined relative directional position of the lamp filament, complementary notch and pin means incorporated with said lamp shield and said socket for determining the position of insertion of said lamp shield therein, and complementary fastener means carried by said socket and said lamp shield in spaced relation both to portions of the socket occupied by said lamp positioning means and to said bearing surface portions of the lamp shield, said fastener means being for engaging one another at a predetermined stage of insertion of the lamp shield in the socket and for releasably holding said lamp shield mounted at a predetermined depth therein, thereby defining the portions of said socket at which said bearing surface and lamp positioning means are held in contact with one another under bias of said resilient means, the spatial position of said lamp filament relative to said socket portions thus being automatically established.

4. In an optical projector, an assembly for mounting a concentrated filament lamp having a base and positioning means to predeterminedly position the filament thereof relative to an optical axis of said projector, said assembly comprising a socket, said positioning means being rigidly attached to said base in predetermined spatial relation to the lamp filament, and being slidable into said socket so as to be held against lateral displacement thereby, coacting means incorporated with the positioning means and said socket for fixing said positioning means against rotation relative to said socket, resilient means mounted adjacent the interior of said socket for biasing said lamp base and positioning means in a direction opposite to that of its insertion in said socket, lamp shield means substantially surrounding said lamp and comprising portions slidable into said socket and terminating in predeterminedly formed leading portions for contacting said positioning means, and cooperating means incorporated with the lamp shield and said socket member and spatially removed both from said leading portions of the lamp shield and portions of said socket adjacent said lamp positioning means for releasably holding said lamp shield mounted at a predetermined depth within said socket, whereby contact of said leading portions with said positioning means and compression of said resilient means to maintain said contact is established, said cooperating holding means and leading portions of the lamp shield coacting with said positioning means and said resilient means to predeterminedly position the positioning means within said socket and thereby to automatically position the lamp filament relative to said optical axis.

5. An assembly for mounting a concentrated filament lamp having a base and lamp positioning means incorporated therewith, the latter including a plurality of bearing-surface areas predeterminedly located with respect to the lamp filament, said assembly comprising, a socket having a bore for slidably receiving said lamp positioning means and for holding the same fixed against lateral displacement when positioned therein, means incorporated with said socket for fixing the lamp positioning means against rotation therein, lamp shield means having portions slidable into the bore of said socket and having leading extremities which provide a plurality of bearing-surface areas for contacting said surface areas of the lamp positioning means, spring means for biasing said lamp positioning means toward said lamp shield extremities for holding the former in contact with the latter and for constantly urging both said lamp positioning means and said lamp shield in a direction outwardly of said socket, and cooperating releasable holding means incorporated with said lamp shield and socket comprising a plurality of mutually engaging bearing surfaces, said holding means being spatially removed both from said leading extremities of the lamp shield and portions of said socket bore occupied by said lamp positioning means and providing a limit stop relative to said movement of the lamp positioning means and lamp shield outwardly of the socket, thereby providing a predetermined position of the lamp filament relative to portions of the assembly.

6. An assembly for mounting a concentrated filament lamp having a base and lamp positioning means incorporated therewith, the latter including a plurality of bearing-surface areas predeterminedly located with respect to the lamp filament, said assembly comprising, a housing having access means formed in an extremity thereof, a socket mounted within said housing substantially facing said access means and having a cylindrical bore for slidably receiving said lamp positioning means and for holding the same fixed against lateral displacement when positioned therein, means incorporated with said socket for fixing the lamp positioning means against rotation therein, lamp shield means having cylindrical portions slidable into the bore of said socket and having leading extremities which provide a plurality of bearing-surface areas for contacting said surface areas of the lamp positioning means, spring means for biasing said lamp positioning means toward said lamp shield extremities for holding the former in contact with the latter and for constantly urging both said lamp positioning means and said lamp shield in a direction outwardly of said socket, and cooperating releasable holding means incorporated with said lamp shield and socket comprising a plurality of mutually engaging bearing surfaces, said holding means being spatially separated both from said leading extremities of the lamp shield and portions of said socket bore adjacent those portions of the bore occupied by said lamp positioning means and providing a limit stop relative to said movement of the lamp positioning means and lamp shield outwardly of the socket, thereby providing a predetermined position of the lamp filament relative to portions of the assembly.

7. An assembly for mounting a concentrated filament lamp having a base and a positioning flange incorporated therewith, the latter including a plurality of protruding, bearing-surface areas predeterminedly located with respect to the lamp filament, said assembly comprising, a socket having a bore for slidably receiving said positioning flange and for holding the same fixed against lateral displacement when positioned therein, means incorporated with said socket for fixing the lamp positioning flange against rotation therein, lamp shield means having portions slidable into the bore of said socket and having leading extremities which provide a plurality of bearing-surface areas for contacting said surface areas of the positioning flange, spring means for biasing said positioning flange toward said lamp shield extremities for holding the former in contact with the latter and for constantly urging both said positioning flange and said lamp shield in a direction outwardly of said socket, and cooperating releasable holding means incorporated with said lamp shield and socket comprising a plurality of mutually engaging bearing-surfaces, said holding means being spatially removed both from said leading extremities of the lamp shield and portions of said socket bore adjacent those portions of the bore occupied by said lamp positioning means and providing a limit stop relative to said movement of the positioning flange and lamp shield outwardly of the socket, thereby providing a predetermined position of the lamp filament relative to portions of the assembly.

8. An assembly for mounting a concentrated filament lamp having a base and a positioning flange incorporated therewith, the latter including a plurality of substantially coplanar bearing-surface areas predeterminedly located with respect to the lamp filament, said assembly comprising, a socket having a bore for slidably receiving said positioning flange and for holding the same fixed against lateral displacement when positioned therein, means incorporated with said socket for fixing the positioning flange against rotation therein, lamp shield means having portions slidable into the bore of said socket and having substantially coplanar leading extremities which provide a plurality of bearing-surface areas for contacting said surface areas of the positioning flange, spring means for biasing said positioning flange toward said lamp shield extremities for holding the former in contact with the latter and for constantly urging both said positioning flange and said lamp shield in a direction outwardly of said socket, and cooperating releasable holding means incorporated with said lamp shield and socket comprising a plurality of mutually engaging bearing surfaces, said holding means being spatially removed both from said leading extremities of the lamp shield and portions of said socket bore adjacent those portions of the bore occupied by said lamp positioning means and providing a limit stop relative to said movement of the positioning flange and lamp shield outwardly of the socket, thereby providing a predetermined position of the lamp filament relative to portions of the assembly.

9. An assembly for mounting a concentrated filament lamp having a base and lamp positioning means incorporated therewith, the latter including a plurality of bearing-surface areas predeterminedly located with respect to the lamp filament, said assembly comprising, a socket having a bore for slidably receiving said lamp positioning means and for holding the same fixed against lateral displacement when positioned therein, shoulder means extending transversely inwardly of said socket for limiting the distance to which said lamp positioning means may be inserted in said socket, means incorporated with said socket for fixing the lamp positioning means against rotation therein, lamp shield means having portions slidable into the bore of said socket and having leading extremities which provide a plurality of bearing-surface areas for contacting said surface areas of the lamp positioning means, a pair of spring members carried by said socket providing electrical connection with said lamp, said spring members also serving to bias said lamp and lamp positioning means toward said lamp shield extremities for holding the former in contact with the latter and for constantly urging both said lamp positioning means and said lamp shield in a direction outwardly of said socket, and cooperating releasable holding means incorporated with said lamp shield and socket comprising a plurality of mutually engaging bearing surfaces, said holding means being spatially removed both from said leading extremities of the lamp shield and portions of said socket bore adjacent those portions of the bore occupied by said lamp positioning means and providing a stop for limiting said movement of the lamp positioning means and lamp shield in a direction outwardly of the socket, thereby providing a predetermined position of the lamp filament relative to portions of the assembly.

10. In an optical projector, an assembly for mounting a concentrated filament lamp to position the filament thereof with respect to an optical axis of said projector, said lamp including a base having a flange rigidly mounted thereon, a plurality of bearing-surface areas on said flange predeterminedly spaced from the filament and peripheral portions concentric therewith, said assembly comprising, in combination, a socket member having a bore for slidably receiving said flange and for holding said peripheral portions against lateral displacement, coacting means incorporated with said flange and socket member for fixing said flange against rotation when located in said socket member, lamp shield means slidable into the bore of said socket member and having leading extremities providing a plurality of bearing-surface areas for contacting said surface areas of the flange, resilient means carried by said socket member for biasing said flange toward said lamp shield and for constantly urging both said lamp flange and said lamp shield in a direction outwardly of said socket member, and cooperating releasable holding means incorporated with said lamp shield and said socket member comprising a plurality of mutually engaging bearing surfaces predeterminedly spaced from said lamp shield extremities, said holding means, in cooperation with said flange, said lamp shield bearing-surface areas and said biasing means, providing a limit stop relative to movement of the flange and lamp shield outwardly of the socket member, and a predetermined spacing of said surface areas relative to the optical axis when assembled, thereby establishing both the proximity and angular position of said lamp filament relative to said optical axis.

11. In an optical projector comprising a housing, a plurality of cooperating adjustable means mounted on the housing for carrying elements of the projector and for establishing an optical axis thereof, and other cooperating means mounted on one of the adjustable means for automatically positioning the filament of a prefocused lamp, having a positioning flange, with respect to said optical axis, said cooperating means comprising, in combination, angularly and bodily adjustable carrier means for positioning a condenser lens system mounted on frontal portions of said housing, bodily adjustable carrier means for positioning an angularly adjustable reflector mounted on rear portions of said housing, angularly and bodily adjustable lamp socket positioning means mounted within central portions of said housing, aforesaid means establishing an optical axis extending through the condenser lens system, lamp filament and center of the reflector, a socket adapted to slidably receive said lamp positioning flange and to hold the same fixed against lateral and rotational displacement, a lamp chimney having portions adapted to be slidably inserted inwardly of said socket and having leading extremities which provide a bearing surface adapted to contact said lamp flange, resilient means carried by and mounted centrally of said socket for biasing said lamp flange toward said lamp chimney extremities, for holding the former in contact with the latter and for constantly urging both said flange and lamp chimney in a direction outwardly of said socket, and cooperating releasable holding means incorporated with said lamp chimney and socket, said holding means being spatially removed from said leading extremities of the lamp shield and portions of said socket adjacent those portions occupied by said lamp positioning flange providing a limit stop for terminating said movement of the lamp flange and chimney outwardly of the socket and, in cooperation with aforesaid means, providing a predetermined position of the lamp filament relative to said optical axis.

12. In an optical projector comprising a lamp housing, an assembly for adjustably mounting a condenser lens system adjacent an aperture formed in said housing, said assembly comprising an annular supporting member adapted to be mounted upon said lamp housing comprising an outwardly extending flange, an annular preferably metallic gasket composed of a material harder than the material of said lamp housing interposed between said supporting member and said lamp housing, a plurality of adjustable tensioning screws radially and circumferentially positioned around frontal portions of said supporting member, said tensioning screws being freely rotatable in perforations formed in said gasket and supporting member and threadedly engaging said lamp housing, a like number of adjustable thrust screws positioned around said supporting member adjacent said tensioning screws, said thrust screws being threaded through said supporting member and their extremities bearing against said gasket, said tensioning and thrust screws operating cooperatively in opposite directions to enable angular adjustment of said supporting member, an annular carrier member, a lens tube having a condenser lens system mounted therein, said lens tube being threadedly engaged in said carrier member for adjustment longitudinally thereof, and a plurality of circumferentially spaced adjusting screws threaded through said flange and bearing against said carrier member for centering the latter, the aforesaid tensioning, thrust and adjusting screws operating to permit alignment of the optical axis of said condenser lens system with an optical axis of an image forming system with which said projector is to be used.

13. In an optical projector comprising a lamp housing, an assembly for adjustably mounting a condenser lens system adjacent an aperture formed in said housing, said assembly comprising an annular supporting member adapted to be mounted upon said lamp housing comprising an outwardly extending flange, an annular preferably metallic gasket composed of a material harder than the material of said lamp housing interposed between said supporting member and said lamp housing, a plurality of adjustable tensioning screws radially and circumferentially positioned around frontal portions of said supporting member, said tensioning screws being freely rotatable in perforations formed in said gasket and supporting member and threadedly engaging said lamp housing, a like number of adjustable thrust screws positioned around said supporting member adjacent said tensioning screws, said thrust screws being threaded through said supporting member and their extremities bearing against said gasket, said tensioning and thrust screws operating cooperatively in opposite directions to enable angular adjustment of said supporting member, an annular carrier member comprising a face adapted to slidably contact a face of said supporting member and a peripheral surface inclined acutely with respect to said face, a lens tube having a condenser lens system mounted therein, said lens tube being threadedly engaged in said carrier member for adjustment longitudinally thereof, a locking ring threadedly engaging said lens tube and adapted to be tightened against said carrier member, a plurality of circumferentially spaced adjusting screws threaded angularly through said flange and bearing against said inclined peripheral surface of said carrier member for centering the latter, and a cover plate having an aperture formed therein adapted to be releasably mounted around aforesaid means, the aforesaid tensioning, thrust and adjusting screws operating to permit alignment of the optical axis of said condenser lens system with an optical axis of an image forming system with which said projector is to be used.

14. An assembly for adjustably mounting an incandescent lamp in a lamp housing and for securely maintaining same in an adjusted position relative to rigid supporting means extending inwardly of said housing, said assembly comprising a lamp socket substantially centrally positioned between the sides of said housing, a pair of adjustable tensioning screws mounted for free rotation and small transverse movement in a pair of apertures formed in said supporting means and screws threadedly engaging said socket means, said apertures and adjusting screws lying in a plane substantially longitudinally bisecting the interior of said housing, and a pair of adjustable thrust screws extending through a second pair of apertures formed in said supporting means and having screw threaded engagement therewith, the extremities of said second pair of screws bearing against portions of said lamp socket means lying in a plane which also substantially longitudinally bisects the interior of said housing and which is also substantially perpendicular to said first-named plane, said pairs of adjusting screws operating cooperatively to permit adjustment of said socket longitudinally of said housing or angularly in any direction with respect to said lamp housing, said pairs of screws also serving to securely maintain said socket in any adjusted position.

15. An assembly for adjustably mounting a reflector in a lamp housing comprising supporting plate means releasably attached to said housing and substantially covering an orifice thereof, said plate having a plurality of circumferentially spaced apertures formed therein serving as access means therethrough, adjustable carrying plate means adapted to be moved freely in said orifice in slidable contact with said supporting plate, said carrying plate having a central aperture formed therein, a clamping plate of smaller dimensions than said carrying plate, a tensioning screw mounted for free rotation through said supporting plate extending through said central aperture in spaced relation to said carrying plate and threaded in said clamping plate for holding both the clamping plate in frictional contact with the carrying plate and said carrying plate in frictional contact with said supporting plate at any of a plurality of positions permitted by the spacing of said tensioning screw in said central aperture, a concave reflector, frame means for mounting said reflector, a plurality of radially and circumferentially positioned adjustable tensioning screws mounted for free rotation through said carrying plate and threadedly engaging said frame means, and a like number of adjustable thrust screws positioned adjacent said first-named adjusting screws, threaded through said carrying plate and bearing against said frame means, the aforesaid tensioning screw and clamp permitting adjustments of the reflector in a given plane and said plurality of tensioning and thrust screws permitting angular adjustments of the reflector relative to said plane.

16. A substantially cylindrical, vertically-extending lamp housing comprising a pair of diametrically opposite apertures formed frontally and rearwardly of upper portions thereof for removably mounting, respectively, a condenser lens system and a reflector, means for adjustably mounting said condenser lens system and said reflector adjacent said apertures, means for adjustably mounting a filament lamp and a removable apertured lamp chimney associated therewith centrally of said housing so that the filament of said lamp may be positioned within an optical axis extending through said condenser lens system and the center of said reflector, an aperture formed in the upper extremity of said housing and a removable closure thereof, said aperture providing access means within said housing, a motor-driven exhaust fan mounted centrally within said housing beneath said lamp mounting means, louver means formed in said housing adjacent upper extremities thereof for admitting cooling air thereinto, louver means formed in said housing adjacent said exhaust fan for enabling expulsion of air therefrom, suitable spacing between said lamp chimney and lamp mounting means and between said lamp chimney and lamp housing being provided for circulation of cooling air downwardly interiorly and exteriorly of said chimney, said constructions whereby cool air may be drawn within said housing through said upper louver means and passed over elements mounted within said housing and heated air may be expelled therefrom through said louver means adjacent the exhaust fan, the cylindrical form of said housing contributing to a rapid flow of air therethrough.

17. A device of the character described comprising a housing having an opening formed in a side wall thereof, an assembly for adjustably mounting a condenser lens system on the housing adjacent and in alignment with said opening, an assembly for adjustably mounting a reflector on a side of the housing opposite said condenser lens system, and an assembly for adjustably mounting lamp supporting and positioning means of the device substantially centrally within the housing, said condenser lens mounting assembly comprising an annular supporting member adapted to be mounted upon said housing comprising an outwardly extending flange, an annular preferably metallic gasket composed of a material harder than the material of said housing interposed between said supporting member and said housing, a plurality of adjustable tensioning screws radially and circumferentially positioned around frontal portions of said supporting member, said tensioning screws being freely rotatable in perforations formed in said gasket and supporting member and threadedly engaging said housing, a like member of adjustable thrust-screws positioned around said supporting member adjacent said tensioning screws, said thrust-screws being threaded through said supporting member and their extremities bearing against said gasket, said tensioning and thrust-screws operating cooperatively in opposite directions to enable angular adjustment of said supporting member, an annular carrier member, a lens tube having a condenser lens system mounted therein, said lens tube being threadedly engaged in said carrier member for adjustment longitudinally thereof, and a plurality of circumferentially spaced adjusting screws threaded through said flange and bearing against said carrier member for centering the latter, the aforesaid tensioning, thrust and adjusting screws operating to permit alignment of the optical axis of said condenser lens system with an optical axis of an image forming system with which said projector is to be used.

18. A device of the character described comprising a housing having an opening formed in a side wall thereof, an assembly for adjustably mounting a condenser lens system on the housing adjacent and in alignment with said opening, said condenser lens system providing an optical axis, an assembly for adjustably mounting a reflector relative to said optical axis on a side of the housing opposite said condenser lens system, and an assembly for adjustably mounting lamp supporting and positioning means of the device substantially centrally within the housing to provide a predetermined position of the lamp filament relative to said optical axis, said last-named assembly comprising rigid supporting means extending inwardly of said housing, means comprising a lamp socket adapted to be substantially centrally positioned between the sides of said housing, a pair of adjustable tensioning screws mounted for free rotation and small bodily movement in a pair of perforations formed in said supporting means and threadedly engaging said socket means, said apertures and adjusting screws preferably lying in a plane longitudinally bisecting the interior of said housing, and a pair of adjustable thrust screws extending through a second pair of perforations formed in said supporting means of the housing in threaded engagement therewith, their extremities bearing against central portions of said lamp socket means lying in a plane which also longitudinally bisects the interior of said housing but which is perpendicular to said first-named plane, the aforesaid adjusting screws operating cooperatively to permit adjustment of said socket longitudinally and angularly with respect to said housing.

19. A device of the character described comprising a housing having an opening formed in a side wall thereof, an assembly for adjustably mounting a condenser lens system on the housing adjacent and in alignment with said opening, an assembly for adjustably mounting a reflector on a side of the housing opposite said condenser lens system, and an assembly for adjustably mounting lamp supporting and positioning means of the device substantially centrally within the housing, said reflector mounting assembly comprising supporting plate means releasably attached to said housing, said plate having a plurality of circumferentially spaced apertures formed therein serving as access means therethrough, adjustable carrying plate means adapted to be moved freely in slidable contact with said supporting plate, said carrying plate having a central aperture formed therein, a clamping plate of smaller dimensions than said carrying plate, a tensioning screw mounted for free rotation through said supporting plate extending through said central aperture in spaced relation to said carrying plate and threaded in said clamping plate for holding both the clamping plate in frictional contact with the carrying plate and said carrying plate in frictional contact with said supporting plate at any of a plurality of positions permitted by the spacing of said tensioning screw in said central aperture, a concave reflector, frame means for mounting said reflector, a plurality of radially and circumferentially positioned adjustable tensioning screws mounted for free rotation through said carrying plate and threadedly engaging said frame means, and a like number of adjustable thrust screws positioned adjacent said first-named adjusting screws, threaded through said carrying plate and bearing against said frame means, the aforesaid tensioning screw and clamp permitting adjustments of the reflector in a given plane and said plurality of tensioning and thrust screws permitting angular adjustments of the reflector relative to said plane.

JOSEPH D. REARDON.
LESLIE J. PETERS.

REFERENCES CITED

The following references are of record in the file of this patent:

UNITED STATES PATENTS

| Number | Name | Date |
| --- | --- | --- |
| 1,566,260 | Halvorson | Dec. 15, 1925 |
| 1,667,380 | Handlan | Apr. 24, 1928 |
| 1,825,078 | Marette | Sept. 29, 1931 |
| 1,919,595 | Owens | July 25, 1933 |
| 1,921,214 | Carpenter | Aug. 8, 1933 |
| 1,991,861 | May | Feb. 19, 1935 |
| 2,048,214 | Howell et al. | July 21, 1936 |
| 2,294,219 | Woermann | Aug. 25, 1942 |
| 2,449,713 | Nemeth | Sept. 21, 1948 |